(No Model.)  C. R. BEHNKE.  2 Sheets—Sheet 1.
VALVE FOR RADIATORS.
No. 363,884.　　　　　　　　Patented May 31, 1887.
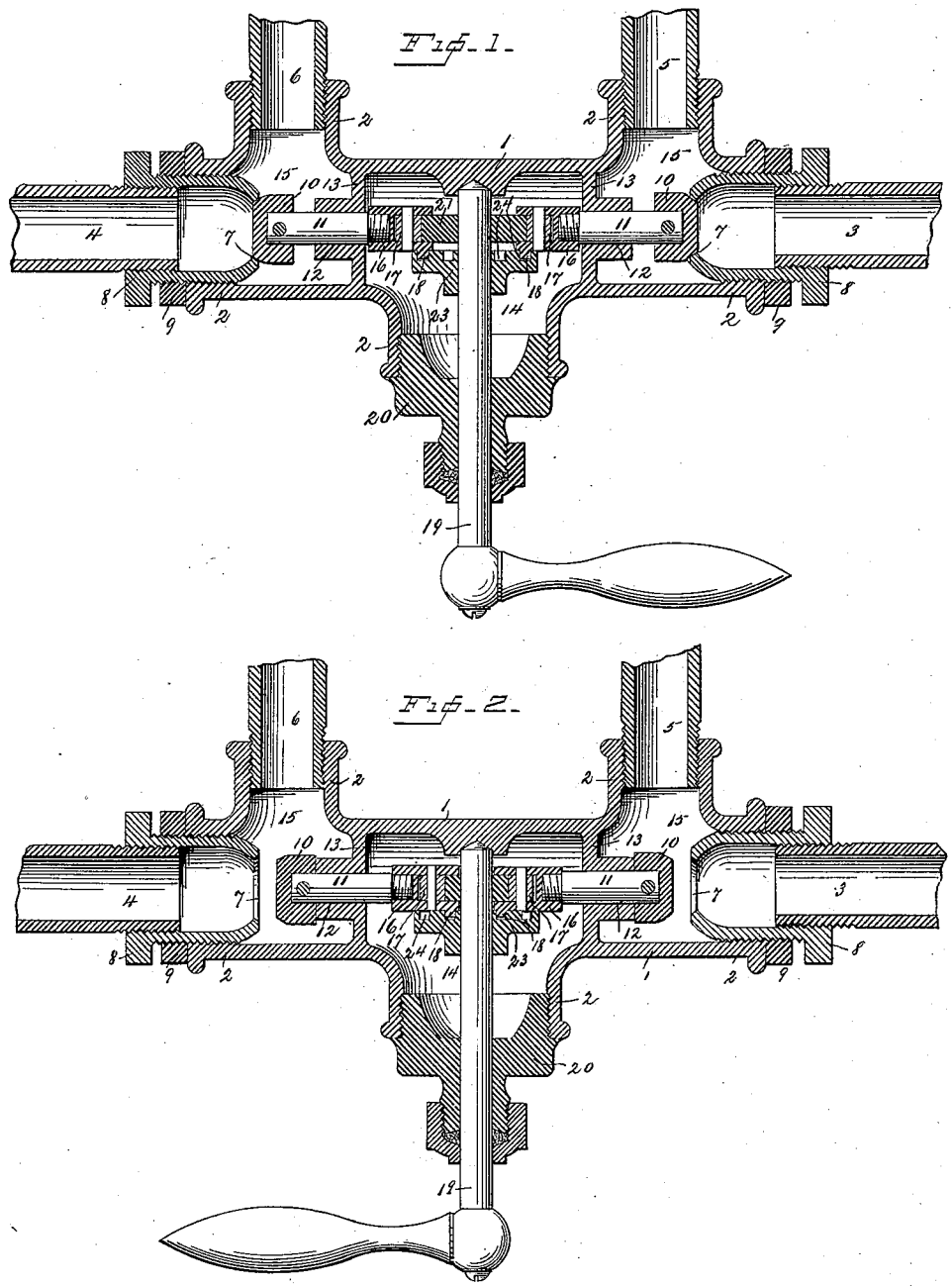
Witnesses_
C. D. Smith
C. E. Ruggles
Inventor_
Charles R. Behnke
By A. M. Wooster
Atty.

(No Model.) 2 Sheets—Sheet 2.

C. R. BEHNKE.
VALVE FOR RADIATORS.

No. 363,884. Patented May 31, 1887.

Witnesses.
C. D. Smith
C. E. Ruggles.

Inventor
Charles R. Behnke
By A. M. Wooster
Atty.

UNITED STATES PATENT OFFICE.

CHARLES R. BEHNKE, OF BRIDGEPORT, CONNECTICUT.

VALVE FOR RADIATORS.

SPECIFICATION forming part of Letters Patent No. 363,884, dated May 31, 1887.

Application filed December 9, 1886. Serial No. 221,094. (No model.)

*To all whom it may concern:*

Be it known that I, CHARLES R. BEHNKE, a citizen of the United States, residing at Bridgeport, in the county of Fairfield and State of Connecticut, have invented certain new and useful Improvements in Valves for Radiators; and I do hereby declare the following to be a full, clear, and exact description of the invention, such as will enable others skilled in the art to which it appertains to make and use the same.

My invention relates to valves for general use, but is especially adapted for use in connection with the supply and exhaust pipes of steam-radiators; and it has for its object to make the valve double-acting, and to simplify and cheapen its general construction, while at the same time its mode of operation shall be greatly improved, the shutting off of the steam being complete and instantaneous, and requiring but a half-turn of the handle.

With these ends in view I have devised the novel construction, of which the following description, in connection with the accompanying drawings, is a specification, numbers being used to indicate the several parts of the device.

Figure 3:
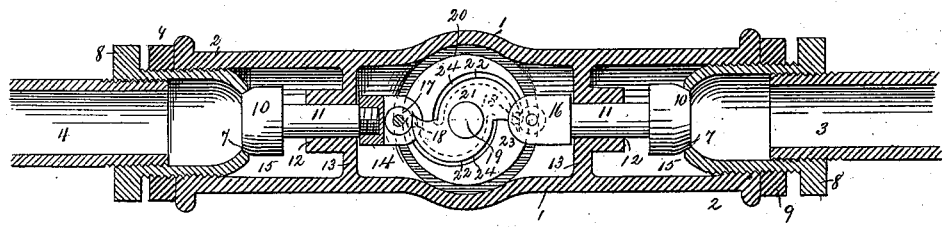
Figure 4:
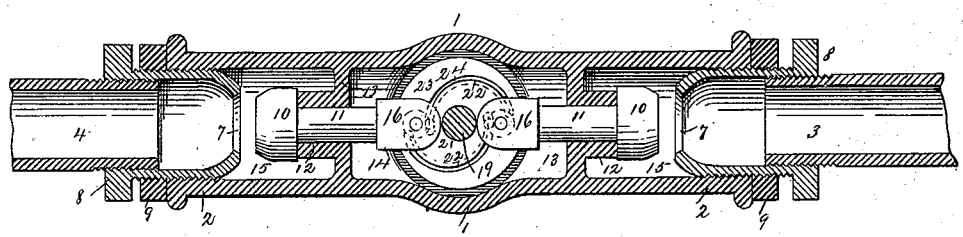
Figure 5:
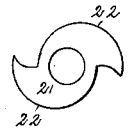
Figure 6:
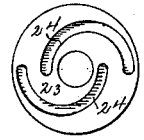

Figure 1 is a vertical longitudinal section of the valve complete, showing the parts in the closed position; Fig. 2, a similar view showing the parts in the open position; Fig. 3, a horizontal section showing in plan the operation of the cam which closes the valve; Fig. 4, a similar view with the upper cam removed, showing in plan the cam which opens the valve; Fig. 5, a detail view of the closing-cam detached, and Fig. 6 is a detail view of the opening-cam detached.

1 denotes the valve-case; 2, hubs cast integral therewith; 3, the supply-pipe; 4, the exhaust-pipe; 5, the inlet-pipe by which steam is admitted to the radiator, (not shown,) and 6 the outlet-pipe by which the steam and water of condensation escape from the radiator.
The hubs are all provided with internal screw-threads, and the inlet and outlet pipes are screwed directly into their corresponding hubs.

7 denotes the valve-seats, preferably made upon externally-threaded sleeves 8, which are screwed into position in their corresponding hubs and then secured there by check-nuts 9. The supply and exhaust pipes are threaded to engage the outer ends of the sleeves. By making these sleeves adjustable and removable I insure in the simplest manner possible perfectly accurate contact of the valve-disks 10 with the seats, and also provide for the removal of the valve-seats should they become worn and require grinding down, or should new ones be required. The valve-disks are carried by stems 11, which are adapted to reciprocate in bearings 12 in partitions 13, by which central chamber, 14, which contains the operating mechanism, is separated from the steam-chambers 15 at the opposite ends of the valve. The stems are made to fit closely in the bearings, as it is desirable that neither steam nor water should enter the central chamber. At the inner ends of the stems are blocks 16, carrying rollers 17, and provided on their under sides with lugs or pins 18, the purpose of which will presently be explained.

19 is an operating-shaft, the upper end of which is stepped into the top of the valve-case, and which is journaled in a cap, 20, threaded to engage a hub on the under side of the case.

21 denotes a cam near the upper end of the shaft, which is rigidly secured thereto and is provided with two eccentric inclines, 22, which bear against rollers 17.

23 is a disk carried by shaft 19, and located just under cam 21. This disk is provided with two eccentric grooves, 24, which are engaged by lugs or pins 18 upon the under sides of blocks 16. The action of the cam and grooved disk to open and close the valve is clearly shown in Figs. 3 and 4. Suppose that it is desired to close the valve. The handle upon the operating-shaft is moved in the proper direction, (the right,) as shown in the drawings, which imparts a partial rotation to cam 21, causing the rollers to ride up the inclines, and forcing both disks to the closed position, as clearly shown in Figs. 1 and 3. At the same time lugs 18 will have passed to the outer ends of grooves 24, the ends of said grooves acting as stops to prevent the possibility of the rollers passing off from the cams. When it is desired to open the valve, the handle upon the operating-shaft is simply given a half-turn in the opposite direction. This causes lugs 18 to ride to the inner ends of grooves 24, the rollers at the same time riding down the inclines, so that the parts are thrown to the position shown in Figs. 2 and 4.

As already stated, I secure an absolutely-perfect cut-off when the disks are pressed against the sides, by making the seats themselves adjustable and removable, if necessary. It will of course be apparent that the valve would be opened and closed by the engagement of lugs 18 with eccentric grooves 24. As considerable pressure, however, is required to close the supply-pipe tight against the pressure of steam, and as considerable strain would necessarily come upon the lugs, I preferably use cam 21 in order to secure great pressure in a direct line in closing the valve.

I do not desire to limit myself to the exact details of construction shown and described, as they may obviously be varied within reasonable limits without departing from the spirit of my invention.

I claim—

1. The valve-case having partitions 13, whereby three chambers are formed, valve seats and disks in the two outer chambers, and valve-stems having bearings in said partitions, and rollers at their inner ends, in combination with a cam having eccentric inclines 22, adapted to bear against the rollers, whereby both disks are forced against the seats.

2. The combination, with the disks, stems carrying rollers, and a cam having eccentric inclines which bear against the rollers, of threaded hubs at the opposite ends of the case, and threaded sleeves having seats at their inner ends which are threaded to engage the hubs.

3. The valve-seats, valve-disks, and stems by which they are carried, having blocks at their inner ends provided with rollers and lugs 18, in combination with the operating-shaft carrying a cam provided with eccentric inclines adapted to engage said rollers, and a disk having eccentric grooves engaged by said lugs, whereby rotation of the shaft acts to open or close the valve.

4. The operating shaft carrying a cam, 21, with eccentric inclines 22, and a disk, 23, with eccentric grooves 24, in combination with the seats, disks, and stems, and boxes at the inner ends of the stems having rollers adapted to engage the inclines, and lugs adapted to engage the grooves, as and for the purpose set forth.

5. In a valve, an operating-shaft stepped in the case and journaled in a cap, 20, in combination with a cam upon said shaft having eccentric inclines 22, and a disk having eccentric grooves 24, and stems 11, having rollers engaged by said cams and lugs which engage said grooves, as and for the purpose set forth.

6. A case for double-acting valves, having threaded hubs at opposite ends, and partitions 13, having bearings 12, in combination with threaded sleeves having valve-seats, said sleeves engaging said hubs, and check-nuts whereby the sleeves are locked in any desired position, as and for the purpose set forth.

7. A double-acting valve consisting of a case having steam-chambers 15 at opposite ends, partitions separating said chambers from a central chamber, 14, seats and disks in chambers 15, valve-stems journaled in said partitions, and operating mechanism in the central chamber whereby the disks are operated together.

In testimony whereof I affix my signature in presence of two witnesses.

CHARLES R. BEHNKE.

Witnesses:
A. M. WOOSTER,
E. D. SMITH.